United States Patent [19]

Hechtenberg

[11] 4,255,795
[45] Mar. 10, 1981

[54] PROGRAMMABLE BINARY CORRELATOR

[75] Inventor: Kurt-Volker Hechtenberg, Eglharting, Fed. Rep. of Germany

[73] Assignee: Messerschmitt-Bölkow-Blohm GmbH, Munich, Fed. Rep. of Germany

[21] Appl. No.: 962,643

[22] Filed: Nov. 21, 1978

[30] Foreign Application Priority Data

Nov. 22, 1977 [DE] Fed. Rep. of Germany ....... 2752062

[51] Int. Cl.³ .............................................. G06F 15/34
[52] U.S. Cl. ...................................... 364/728; 364/604
[58] Field of Search ............................... 364/728, 604; 343/100 CL

[56] References Cited

U.S. PATENT DOCUMENTS

| 3,777,133 | 12/1973 | Beck et al. | 364/728 |
| 3,878,381 | 4/1975 | Broder et al. | 364/728 |
| 3,881,101 | 4/1975 | Pederson et al. | 364/728 |
| 4,097,801 | 6/1978 | Freeman et al. | 364/728 |
| 4,121,297 | 10/1978 | Smith | 364/728 |

FOREIGN PATENT DOCUMENTS 2629740  6/1978  Fed. Rep. of Germany .......... 364/728

Primary Examiner—Felix D. Gruber
Attorney, Agent, or Firm—Toren, McGeady and Stanger

[57] ABSTRACT

A programmable binary correlator with one-digit, digital sampling is disclosed. The binary correlator includes input comparators for converting a signal to digital form, each comparator connected to a storage unit. The storage units are connected to programmable counters which, in turn, coact, through a control element, with additional counters. The various counters, control element and storage units cooperate with a unit for supplying programmed signals. A clock signal generator is present to control the correlator timing and supply necessary pulse signals. By storing digital representations of two input signals in the storage units in a particular way, by comparing these stored signals bit by bit in a coincidence tester, by repeating the comparison by repeatedly shifting one stored signal relative to the other, and by storing the number of coincidences in a final counter, a correlation of the two input signals is made. An analog correlator employing a plurality of such binary correlators is also disclosed.

5 Claims, 8 Drawing Figures

PROGRAMMABLE BINARY CORRELATOR

FIELD OF THE INVENTION

The invention relates to a programmable binary correlator with one-digit digital sampling.

BACKGROUND OF THE INVENTION

Correlators with one-digit digital sampling are known. Their use has become important, particularly in communication engineering and measuring techniques. Their use has also become important in all those instances in which, in the broadest sense, a wave-like signal has to be compared to another wave-like signal.

When, for example, the signal sequence with hard limitation of an emitted sound signal is correlated with one of the echo, it is possible to determine the traveled distance of the sound waves to their reflection from the shift period of the two signal sequences. Also belonging to the state of the art are related uses such as for an adjusted filter, for signal recognition and for pattern recognition.

From the German Auslegeschrift No. 26 49 081, there has become known a distance measurement device in which echo signals to be evaluated are processed by using correlation techniques.

The correlator used in this case is taken from the U.S. Pat. No. 3,786,405 and consists essentially of components which are also described in the German Auslegeschrift No. 2 204 028. These components are, first, a sampling unit which samples the signal delivered from a limiter with relatively high sampling speed, and a switch (gate circuit) which introduces the signals waiting in the line from the sampling unit to a first or second time-compression circuit. Each time-compression circuit has a two-position switch which, in dependence on the signal of a time control device, either connects a subsequent shift register to the sampling unit for writing in a signal, or sets the output line of the register to its input so that the bits emerging from the register are pushed around in a circle.

Moreover, the output of the register is connected to a coincidence detector which generates a logically high signal, in the case of consistency of bits, or a logically low signal, in the case of inconsistency, and delivers the signal to an integrator.

An essential property of this correlator is that one shift register is shorter by one bit than the other, so that the circulating signal sequences are shifted relative to each other by one bit in each circulation.

Correlators of the above-described kind have, on the one hand, registers of fixed length. Accordingly, an adjustment to different signal sequences is only possible when different correlators are used. On the other hand, certain portions cannot merely be selected from the register and correlated since, under all conditions, only the entire content can be analyzed. In addition, the shift period of these registers is preselected in a fixed manner so that they have a relatively low operational mobility. With the known correlators, it is not possible to carry out a multi-dimensional correlation in an economically sensible manner.

OBJECTS OF THE INVENTION

It is therefore an object of the invention to provide a correlating unit to be used in signaling techniques, which makes the inherent parameters freely selectable. Such parameters include register length, shift period, scanning or sampling frequency, and which allows the expansion even to multi-dimensional correlation.

SUMMARY OF THE INVENTION

In accordance with the present invention, a programmable binary correlator with a one-digit digital operation of samples comprises first and second means, each responsive to first and second wave-like signal inputs for digitizing the signal inputs, first and second storage means responsive to said first and second comparator means respectively, and first and second presettable counters cooperating with said first and second storage means. Also included are means for supplying programmed signals and control means. Third and fourth counters are included operating in cooperation with the control means and the programmed signal supplying means. The second counter is also responsive to the outputs of the third counter. Clock signal generation means for supplying clock pulses to the control means and a coincidence tester responsive to the outputs of the first and second storage means are additionally included. Finally, a fifth counter actuated by the control means and responsive to the output of the coincidence tester forms a part of the correlator. The fifth counter is for providing correlation values of the first and second signal inputs.

For a better understanding of the present invention, reference is made to the following description and drawings, while the scope of the invention will be pointed out in the appended claims.

DESCRIPTION OF THE PREFERRED EMBODIMENTS

Figure 1:
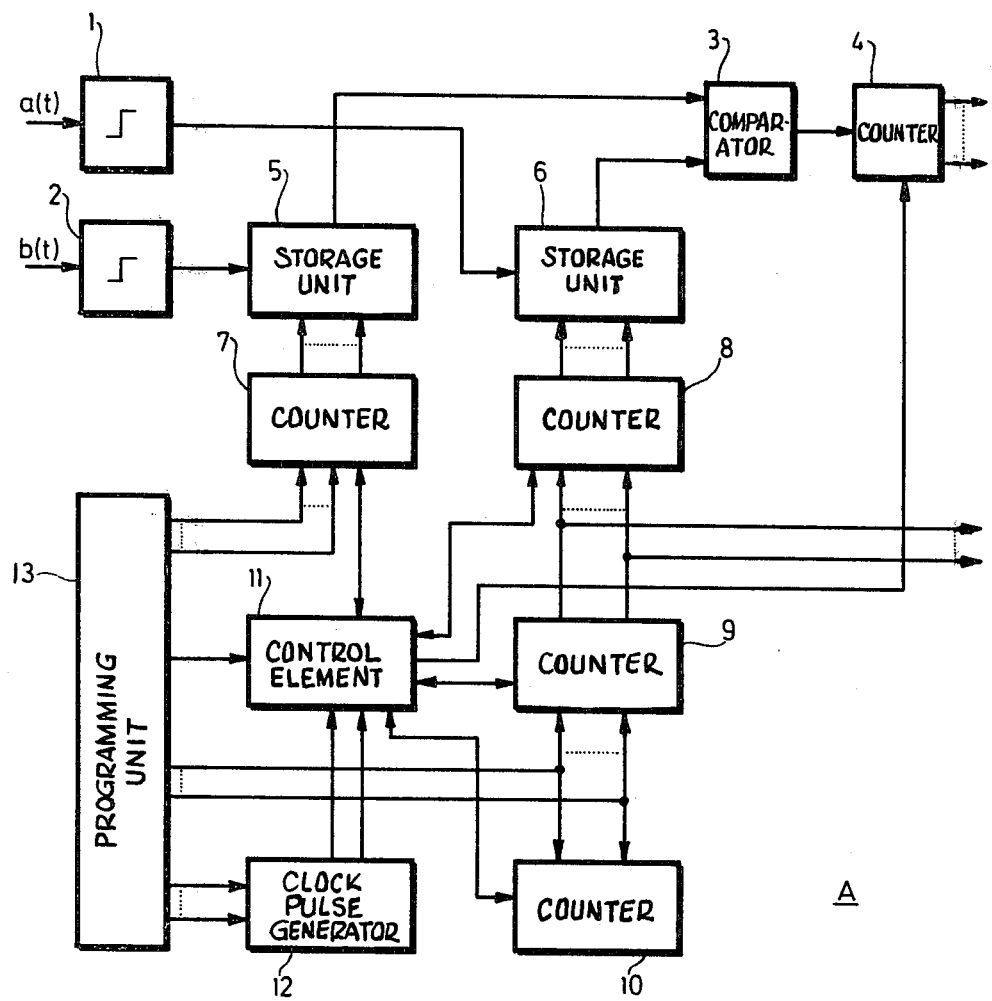
FIG. 1 shows a programmable binary correlator.

According to FIG. 1, the correlator A essentially comprises comparators 1, 2, storage units 5, 6, presettable counters 7, 8, 9, 10, which also perform the address selection, a programming unit 13, a clock-signal generator 12, a control element 11, a coincidence tester 3 and a counter 4.

Comparators 1, 2 compare the signals a(t), b(t) which are variable with time to a reference zero, i.e., so-called digital sampling operations are created which represent a quantization of the signals a(t) or b(t). The comparators 1, 2 are, for example, A/D converters forming hard limits which determine the zero-crossings of the signals. Such comparators include keying portions for performing the sampling operation. The signals a(t) and b(t) are wave-like sequences of signals. In order to correlate the sequences with each other, they are digitized by the comparators 1,2. There result one-digit binary sequences in which the individual bit positions have no specific significance.

More particularly, the programming unit 13 supplies programmed signals and comparators 1 and 2 are first and second devices which are responsive to first and second a(t), b(t) signal inputs for providing sampled, digitized signals. Storage units 5 and 6 are responsive to the first and second devices and have addressable locations therein. Counters 7 and 8 are first and second counters which are responsive to the programmed signals for causing the sampled, digitized signals to be stored as binary sequences in predetermined addressable locations of the first and second storage units and for calling up the signals bit-by-bit. Clock signal generator 12 supplies clock pulses to the correlator elements. Control element 11 controls various elements of the correlator. Counters 7 and 8 operate as third and fourth counters in cooperation with the control element 11 and the programming unit 13. The second counter (8) is also responsive to the third counter (9), coincidence tester 3 is responsive to the outputs of the storage units for comparing the called-up signals. Counter 4 operates as a fifth counter which is actuated by the control element 11 and is responsive to the output of the coincidence tester for increasing the count by one when the coincidence tester 3 indicates coincidence.

Figure 2:
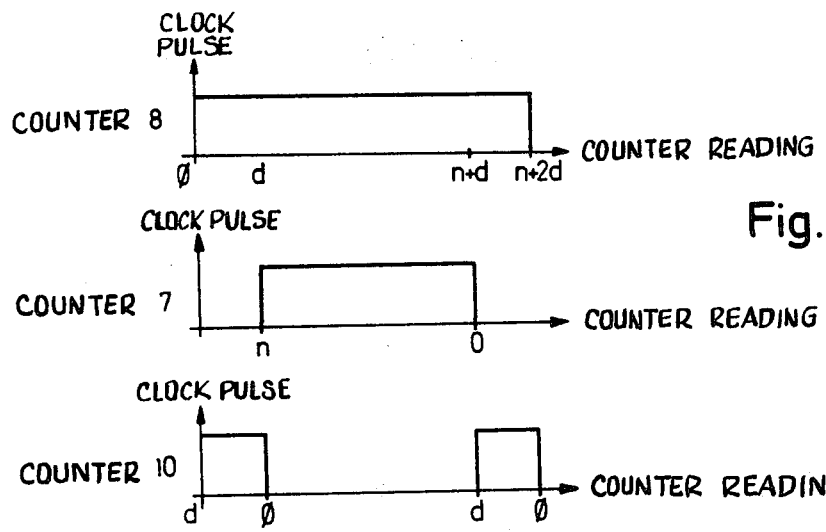
FIGS. 2, 3a 3b 3c and 4 show various counter readings.
Figure 3:
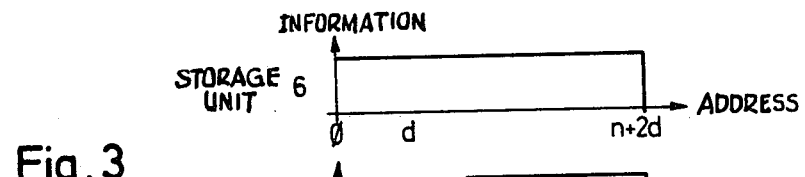
Figure 3:
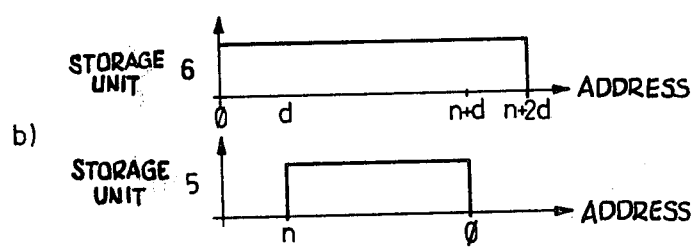
Figure 3:
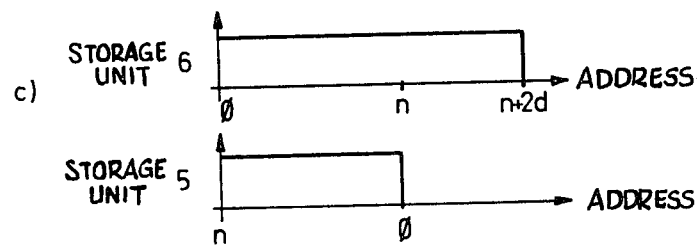
Figure 4:
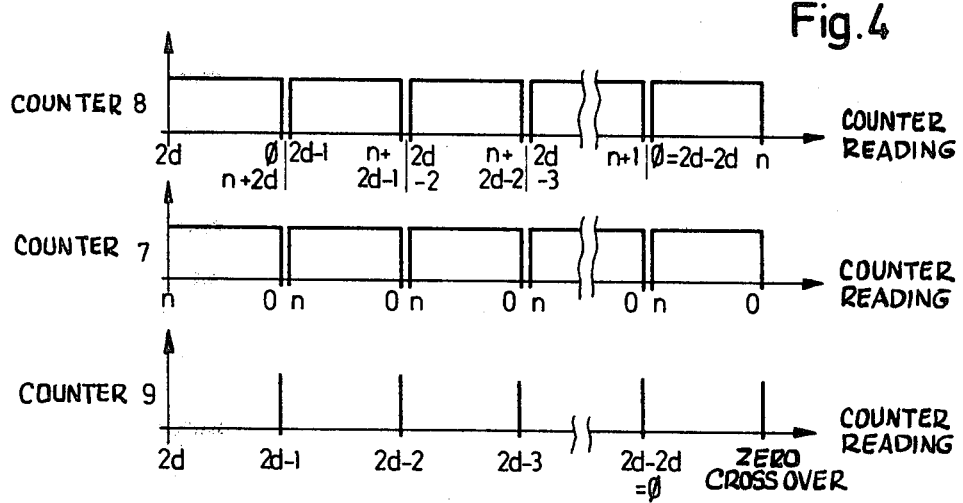

The manner of operation shall now be explained in detail in connection with FIGS. 2, 3 and 4.

Through the initial instruction from the programming unit 13, the counters are preset as follows:

Counter 8 to $\phi$ (zero)
Counter 7 to n $\triangleq$ register length
Counter 10 to d $\triangleq$ maximum shift
Counter 9 to 2d
Counter 4 to $\phi$ The writing cycle is the next step. The analog signals a(t) and b(t) are digitized with one bit in the comparators 1, 2 and are supplied as a binary series to the storage units 6 and 5. The control element 11 applies pulses to the counters 10 and 8 with the chosen clock frequency. The counter 8 enables writing the digitized signals a(t) into the storage unit 6 from address $\phi$ to 2d+n. The counter 10 counts from d to $\phi$ and, upon reaching the ero reading, applies pulses having the clock frequency to the counter 7 by way of control element 11. The counter 7 then enables writing the signal b(t) into storage unit 5 from storage location n to $\phi$. When reaching the zero reading, the counter 7 again applies its pulses of clock frequency to the counter 10 which then, in turn, counts from d to $\phi$. When the latter reaches its zero reading, the writing procedure is concluded. At this point in time (see FIG. 2), n bits are waiting in storage unit 5 with the sign information from the signal b(t) and in the storage unit 8 n+2d bits are waiting with the sign information from the signal a(t). With the additional 2d bits, a possible relative time-shift $\tau$ of the two sets of information can be compensated.

To determine the degree of similarity in dependence on the shift $\tau$, the calculating cycle begins which can be carried out with the highest possible clock frequency. At the beginning of the calculating cycle, the counters are set as follows:

Counter 7 to n
Counter 8 to 2d
Counter 9 to 2d
Counter 10 to $\phi$
Counter 4 to $\phi$ The control element applies pulses of clock frequency to the counters 8 and 7. The counter outputs actuate the corresponding storage locations in the storage units 5 and 6. The two called up bits are then compared in the comparator 3, for example, an Ex-NOR-gate. In the case of coincidence, the counter 4 is increased by 1. After n pulses of clock frequency, the counter 7 has arrived at zero. n comparisons have now taken place and the counter 4 holds the first correlation value for $-\Delta\tau$max (see FIG. 3a).

The counter 7 reaching zero reduces the counter 9 by one, the counter 8 is set to the counter reading before counter 9 2d−1, counter 7 is again set to n, and counter 4 is again set to zero.

Subsequently, the next calculation of the correlation value for $-\Delta\tau$max+1, etc., begins.

Accordingly, the information in storage unit 5 (n-bit) is compared bit by bit to the information in storage unit 6, and, after n comparisons, is relatively shifted by one bit, this being done 2d-times (see FIGS. 3a, 3b, 3c). The number of shifts, for example, is a measure of difference in running times.

As a result, the entire correlation function of the two binary series sgn (a(t)) and sgn (b(t)) of $-\Delta\tau$max to $+\Delta\tau$max ($|\Delta\tau|$max=d) is obtained.

After the calculating cycle, a new writing cycle may again begin.

Figure 5:
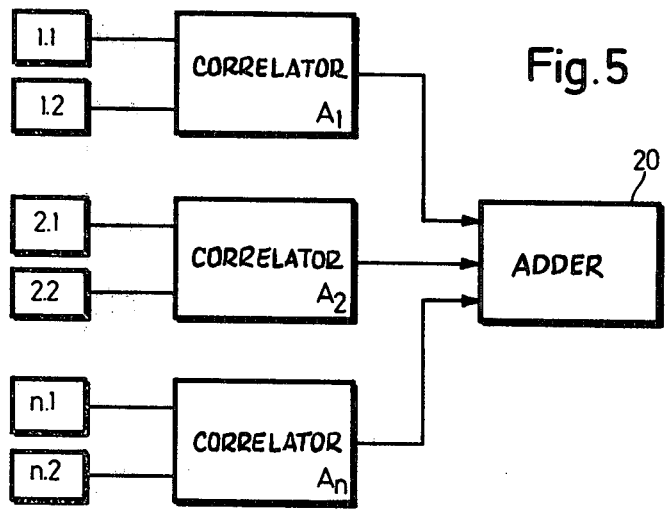
FIG. 5 illustrates an analog correlator.
Figure 6:
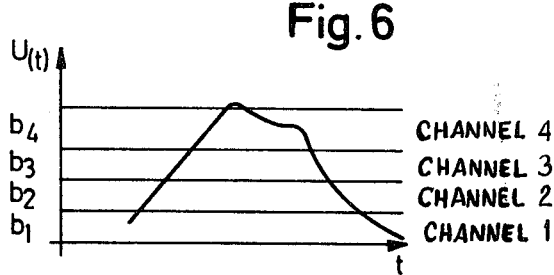
FIG. 6 shows the carrying out of a correlation

The correlation of analog signals by means of parallel-connected binary correlators shall now be explained with the aid of FIGS. 5 and 6.

The amplitude information of the standardized signals is obtained by supplying, after a high-speed value comparison, the input signals to several parallel-connected similar binary correlators. The thresholds of the comparators 1.1 ... n.2 are different (see FIG. 6) so that for each amplitude level a binary correlation is carried out. This means that b-binary correlators are used for b-amplitude levels. Subsequently, the output signals of the individual correlators are summed together to obtain the total value for the quality of coincidence of the two signals.

To be able to register the shift parameters, in addition to the correlation values which can be taken off at the counter, as they are mentioned by way of example in the passage regarding the objects of the invention, the above description illustrates that the shift parameters are taken off between the counter assigned to the first storage unit and an additional counter.

As further described above, two-dimensional correlation with the correlator is facilitated, in a simple manner, in that two-dimensional signals are reduced to one-dimensional signals by combining the lines or columns. Due to the large complexity of the task, the use of a microprocessor as a programming unit is advantageous.

In other areas of application of the correlator, it has been shown to be also possible to correlate analog signals. For this purpose, correlators in accordance with the invention are connected in parallel and comparators with different thresholds are used at the input side, and at the output side an adder is used which sums up the output signals of the individual correlators.

An advantage of the programmable binary correlator lies primarily in the fact that it is possible to be able to freely select the essential parameters from case to case, i.e., that a simple optimization can be carried out. This results in a maximum operational flexibility. Even when used as analog correlator, due to the connection in parallel, the correlation time remains the same as for a simple binary correlation. As a result, for example, pre-digitized patterns and digitized thermal patterns of objects, such as, for example, tanks or the like, can be quickly and reliably correlated and recognized.

Another advantage is that positive as well as negative delay-time-shifts can be recognized and processed.

While the foregoing description and drawings represent the preferred embodiments of the present invention, it will be obvious to those skilled in the art that various changes and modifications may be made therein without departing from the true spirit and scope of the present invention.

What is claimed is:

1. A programmable binary correlator with one-digit digital sampling comprising:
   means for supplying programmed signals;
   first and second means each responsive to first and second a(t), b(t) signal inputs for providing sampled, digitized signals;
   first and second storage means responsive to said first and second means respectively, said storage means having addressable locations therein;
   first and second presettable counters responsive to said programmed signals for determining addresses for causing said sampled, digitized signals to be stored as binary sequences in predetermined addressable locations of said first and second storage means and for calling up said signals bit-by-bit;
   clock signal generation means for supplying clock pulses;
   control means;
   third and fourth counters operating in cooperation with said control means and said programmed signal supplying means, said second counter also responsive to the outputs of the third counter;
   said control means responsive to the output of said clock signal generation means and also operating in cooperation with said first and second counters;
   a coincidence tester responsive to the outputs of said first and second storage means for comparing said signals provided by said first and second storage means; and
   a fifth counter actuated by said control means and responsive to the output of said coincidence tester for increasing the count by one when said coincidence tester indicates coincidence, said fifth counter for providing correlation values of said first and second signal inputs, said programmed signals determining that a predetermined comparative number is obtained from said fifth counter and that the binary sequences are displaced relative to each other in a predetermined manner in which the initial address of the second storage unit is changed by said third counter;
   so that said correlator is adapted to again obtain a predetermined comparative number, and to displace said sequences, said obtaining and displacing functions being repeatable as desired and at any storage address.

2. A programmable binary correlator according to claim 1, including means for allowing for possible relative displacement of the signal inputs, a(t), b(t), to each when entering information in said first and second storage means and wherein said fourth counter provides for entering one of the binary sequences in the appropriate storage means by way of its corresponding presettable counter offset by a predetermined amount.

3. A programmable binary correlator according to claim 1, wherein the means for supplying programmed signals is a microprocessor.

4. An analog correlator incorporating a plurality of binary correlators each comprising means for supplying programmed signals; first and second means each responsive to first and second a(t), b(t) signal inputs for providing sampled, digitized signals; first and second storage means responsive to said first and second means respectively, said storage means having addressable locations therein; first and second presettable counters responsive to said programmed signals for determining addresses for causing said sampled, digitized signals to be stored as binary sequences in predetermined addressable locations of said first and second storage means and for calling up said signals bit-by-bit; clock signal generation means for supplying clock pulses; control means; third and fourth counters operating in cooperation with said control means and said programmed signal supplying means, said second counter also responsive to the outputs of the third counter; said control means responsive to the output of said clock signal generation means and also operating in cooperation with said first and second counters; a coincidence tester responsive to the outputs of said first and second storage means for comparing said called-up signals provided by said first and second storage means; and a fifth counter actuated by said control means and responsive to the output of said coincidence tester for increasing the count by one when said coincidence tester indicates coincidence, said fifth counter for providing correlation values of said first and second signal inputs, said programmed signals determining that a predetermined comparative number is obtained from said fifth counter and that the binary sequences are displaced relative to each other in a predetermined manner in which the initial address of the second storage unit is changed by said third counter, so that said correlator is adapted to again obtain a predetermined comparative number, and to displace said sequences, said obtaining and displacing functions being repeatable as desired and at any storage address; said binary correlators being connected in parallel, each of said binary correlators having a pair of means for providing sampled, digitized signals, each pair at its input having a different threshold, and wherein a single means for adding is included for summing the output signals of all of the correlators.

5. A method for providing binary correlation between two wave-like signals employing a correlator having means for supplying programmed signals; first and second means each responsive to first and second a(t), b(t) signal inputs for providing sampled, digitized signals; first and second storage means responsive to said first and second means respectively, said storage means having addressable locations therein; first and second presettable counters responsive to said programmed signals for determining addresses for causing said sampled, digitized signals to be stored as binary sequences in predetermined addressable locations of said first and second storage means and for calling up said signals bit-by-bit; clock signal generation means for supplying clock pulses; control means; third ahd fourth counters operating in cooperation with said control means and said programmed signal supplying means, said second counter also responsive to the outputs of the third counter; said control means responsive to the output of said clock signal generation means and also operating in cooperation with said first and second counters; a coincidence tester responsive to the outputs of said first and second storage means for comparing said signals provided by said first and second storage means; and a fifth counter actuated by said control means and responsive to the output of said coincidence tester for increasing the count by one when said coincidence tester indicates coincidence, said fifth counter for providing correlation values of said first and second signal inputs, said programmed signals determined that a predetermined comparative number is obtained from said fifth counter and that the binary sequences are displaced relative to each other in a predetermined manner in which the initial address of the second storage unit is changed by said third counter, so that said correlator is adapted to again obtain a predetermined comparative number, and to displace said sequences, said obtaining and displacing functions being repeatable as desired and at any storage address; said method comprising the steps of:

setting the various counters as follows:

said second counter to zero; said first counter to n (where n=register length); said third counter to $2d$ (where d=maximum shift); said fourth counter to d; and said fifth counter to zero;

digitizing said first and second signal inputs and supplying them respectively to said storage units; writing, under control of said second counter, said digitized second signal into the second storage unit from addresses of 0 to $2d+n$; writing, under control of said first counter said digitized first signal into said first storage unit from addresses of n to zero;

setting the various counters as follows:

said first counter to n; said second counter to $2d$; said third counter to $2d$; said fourth counter to zero; and said fifth counter to zero;

comparing the stored contents of said first and second storage units bit-by-bit, employing the first and second counters respectively, said comparison means being made n times;

increasing the content of said fifth counter by one when coincidence of said compared bit is found;

reducing the contents of said third counter by one after n bit-by-bit comparisons are made;

resetting said other counters as follows:

said second counter to the same count as said third counter; said first counter to n; and said counter is to zero; and repeating said comparing, increasing, reducing and resetting steps $2d-1$ more times to obtain a complete correlation function of said first and second signals.

* * * * *